(12) United States Patent
Ravindranath (10) Patent No.: US 11,709,021 B2
(45) Date of Patent: Jul. 25, 2023

(54) THERMAL MANAGEMENT SYSTEM AND METHOD

(71) Applicant: Transportation IP Holdings, LLC, Norwalk, CT (US)

(72) Inventor: Balaji Hosadurgam Ravindranath, Mysore (IN)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 209 days.

(21) Appl. No.: 17/369,468

(22) Filed: Jul. 7, 2021

(65) Prior Publication Data
US 2022/0011051 A1    Jan. 13, 2022

(30) Foreign Application Priority Data
Jul. 13, 2020    (IN) .............................. 202011029731

(51) Int. Cl.
F28D 7/16    (2006.01)

(52) U.S. Cl.
CPC .................................. F28D 7/163 (2013.01)

(58) Field of Classification Search
CPC ........ F28D 7/163; F28D 1/047; F28D 1/0471; F28F 1/02
See application file for complete search history.

(56) References Cited

U.S. PATENT DOCUMENTS

| | | | |
|---|---|---|---|
| 3,183,970 A | 5/1965 | Worley | |
| 5,213,156 A * | 5/1993 | Eriksson | ................. F28D 7/024 165/158 |
| 6,819,561 B2 | 11/2004 | Hartzell et al. | |
| 7,308,932 B2 * | 12/2007 | Doh | ..................... B01D 69/084 165/905 |

(Continued)

FOREIGN PATENT DOCUMENTS

| | | |
|---|---|---|
| CN | 208832775 U | 5/2019 |
| CN | 109990504 B | 7/2019 |

(Continued)

OTHER PUBLICATIONS

Office Action for corresponding Eurasian Application No. 202191661 dated Apr. 11, 2022.

(Continued)

*Primary Examiner* — Jon T. Schermerhorn, Jr.
(74) *Attorney, Agent, or Firm* — The Small Patent Law Group LLC; William Breeze (57) ABSTRACT

A thermal management system and method includes a body having an inlet and an outlet configured to direct a first fluid into and out of the body. The body incudes a channel that is fluidly separate from the inlet and the outlet. A second fluid is directed through the channel. A conduit assembly is fluidly coupled with the inlet and the outlet. The conduit assembly includes plural fluidly separate conduits. Each of the plural conduits extend between a corresponding first end and a corresponding second end along a corresponding tortuous (Continued)

path. The plural conduits are intertwined with each other between the first ends and the second ends. The plural conduits are positioned such that the second fluid flowing through the channel passes over the plural conduits and exchanges thermal energy with the first fluid that moves within each of the plural conduits.

13 Claims, 8 Drawing Sheets (56) References Cited

U.S. PATENT DOCUMENTS

| | | | |
|---|---|---|---|
| 7,866,377 | B2 | 1/2011 | Slaughter |
| 8,091,618 | B2 * | 1/2012 | Doh .................. B01D 63/02 165/157 |
| 9,134,072 | B2 | 9/2015 | Roisin et al. |
| 9,200,855 | B2 | 12/2015 | Kington et al. |
| 9,605,912 | B2 | 3/2017 | Neal et al. |
| 9,752,835 | B2 | 9/2017 | Waldman et al. |
| 10,648,742 | B2 | 5/2020 | Koshimura et al. |
| 2004/0251010 | A1 | 12/2004 | Doh et al. |
| 2010/0243220 | A1 | 9/2010 | Geskes et al. |
| 2016/0231064 | A1 | 8/2016 | Kironn et al. |
| 2017/0082372 | A1 | 3/2017 | Vos et al. |
| 2017/0089643 | A1 | 3/2017 | Arafat |
| 2017/0131034 | A1 | 5/2017 | Ribarov et al. |
| 2017/0167805 | A1 | 6/2017 | Alvarez et al. |
| 2018/0283795 | A1 | 10/2018 | Cerny et al. |
| 2023/0021966 | A1 * | 1/2023 | Barnes .................. B65H 51/105 |

FOREIGN PATENT DOCUMENTS

| | | |
|---|---|---|
| EP | 0717251 A2 | 6/1996 |
| EP | 3211358 A1 | 8/2017 |
| EP | 2459954 B1 | 11/2017 |
| EP | 3265738 A1 | 1/2018 |
| EP | 3312538 A1 | 4/2018 |
| RU | 2444399 C2 | 3/2012 |
| RU | 182250 U1 | 8/2018 |
| SU | 1749684 A1 | 7/1992 |
| WO | 2003029744 A2 | 4/2003 |
| WO | 2004068054 A1 | 8/2004 |
| WO | 2016003754 A1 | 1/2016 |
| WO | 2017165921 A1 | 10/2017 |
| WO | 2018182806 A1 | 10/2018 |

OTHER PUBLICATIONS

3D Systems, "Direct Metal 3D Printing Enables CEEE to Manufacture Lean and Green Heat Exchanger" https://www.3dsystems.com/learning-center/case-studies/direct-metal-printing-dmp-enables-ceee-manufacture-lean-and-green-heat (4 pages).

Bacellar, "Novel Airside Heat Transfer Surface Designs Using an Integrated Multi-Scale Analysis with Topology and Shape Optimization", Purdue University, Purdue e-Pubs, 2016 (9 pages).

Cunningham, "Metal 3D printing likely to offer greatest benefit to thermal parts" Published: Mar. 10, 2017 https://www.eurekamagazine.co.uk/design-engineering-news/metal-3d-printing-likely-to-offer-greatest-benefit-to-thermal-parts/152437/ (3 pages).

Green HP "Heat Exchangers for Next Generation Heat Pump" Grant Agreement No. 308816, FP7-Energy-2012-308816 www.greenhp.eu (19 pages).

Khoshvaght, "3D-CFD simulation and neural network model for the j and f factors of the wavy fin-and-flat tube heat exchangers" vol. 28, No. 03, pp. 505-520, Jul.-Sep. 2011 (17 pages).

Mech Lectures, "Choose-Micro-Channel-Heat-Exchangers-large" Jun. 13, 2017, https://www.mechlectures.com/heat-exchanger-types/choose-micro-channel-heat-exchangers-large/ (2 pages).

Radermacher, "Miniaturized Air-to-Refrigerant Heat Exchangers", 2016 Building Technologies Office Peer Review (30 pages).

Renishaw, "Additive manufacturing crosses the finishing line" https://www.renishaw.com/en/additive-manufacturing-crosses-the-finishing-line-38971 (5 pages).

Saltzman, "Experimental Comparison of a Traditionally Built versus Additively Manufactured Aircraft Heat Exchanger" (11 pages).

Umn, "3D Printable Heat Exchanger", IP Status: Pending U.S. Appl. No. 15/910,459 https://license.umn.edu/product/3d-printable-heat-exchanger (2 pages).

Search Report for corresponding Eurasian Application No. 202191661 dated Dec. 7, 2021.

First Examination Report for corresponding IN Application No. 202011029731 dated Oct. 19, 2022 (8 pages).

Office Action dated Aug. 31, 2022 for corresponding Eurasian Application No. 202191661. English translation provided. (3 pages).

Notice of Acceptance for Patent Application for AU Application No. 2021205005 dated Sep. 16, 2022 (3 pages).

Office Action for corresponding Russian Application No. 202191661 dated Aug. 31, 2022 (4 pages).

First Examination Report for corresponding Application No. 2021205005 dated Jun. 15, 2022.

* cited by examiner

THERMAL MANAGEMENT SYSTEM AND METHOD

BACKGROUND

Cross-Reference to Related Applications

This application claims priority to IN Application No. 202011029731, filed Jul. 13, 2020. The entire disclosure of which is incorporated herein by reference.

Technical Field

The subject matter described relates to fluid thermal management system and methods.

Discussion of Art

Heat exchangers, such as radiators, may include oil, water and air as working media that is cooled or is heated. For example, heat exchangers may be used with engines for transferring heat between different bodies or volumes. For example, a first fluid at a relatively high temperature may pass through a first passageway, and a second fluid at a relatively low temperature may pass through a second passageway. The first and second passageways may be in thermal contact or close proximity, allowing heat from the first fluid to be passed to the second fluid. Thus, the temperature of the first fluid may be decreased and the temperature of the second fluid may be increased.

Figure 1:
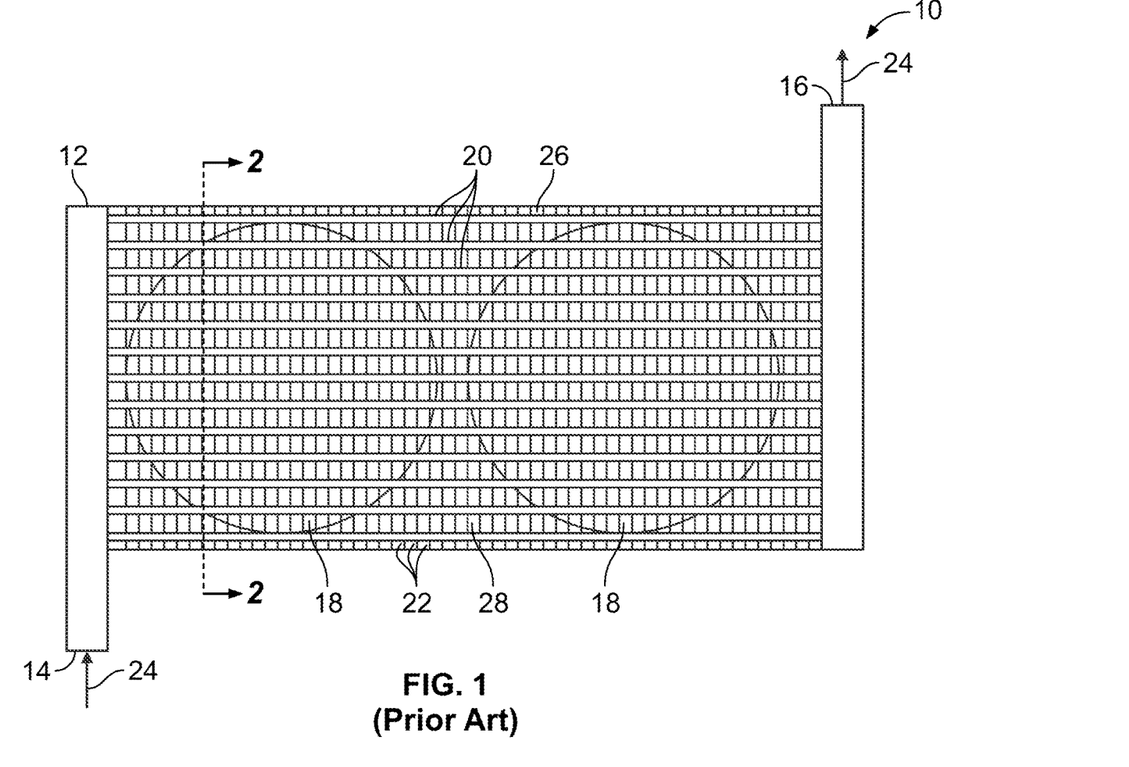
FIG. 1 schematically illustrates a known thermal management system.
Figure 2:
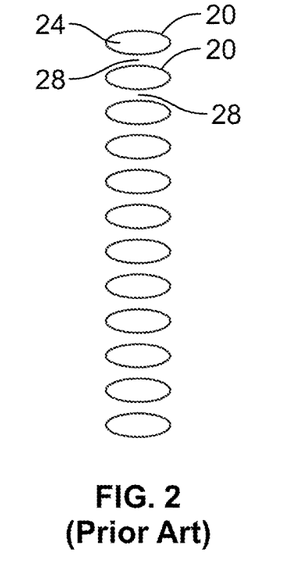
FIG. 2 illustrates a cross-sectional view of the known thermal management system of FIG. 1.

Typically, heat exchangers include a fin-tube design, with the fins providing additional area of interaction between the fluid media to enhance heat transfer as well as provide structural strength to the heat exchanger. As one example, FIG. 1 illustrates a known heat exchanger system 10. The system includes a body 12 having an inlet 14 and an outlet 16 configured to direct a first fluid 24 into and out of the system. The body may also include a channel 26 that is fluidly separate from the inlet and outlet, and that contains a second fluid 28. Plural tubes 20 are fluidly coupled with the inlet and outlet and direct the first fluid through the channel between the inlet and the outlet. FIG. 2 illustrates a cross-sectional view of the system. Each of the tubes has a cross-sectional shape that, in the illustrated embodiment, is substantially oval, and size that is substantially uniform to the size of each other tube. The system also includes plural fins 22 coupled with the tubes for enhanced area of interaction of the plural tubes 20 and the second fluid 28, while providing structural support to the plural tubes 20. The first fluid, that is fluidly separate from the second fluid, moves through the tubes and exchanges thermal energy with the second fluid that is directed within the channel. Each of these parts may need to be individually positioned, oriented, and connected to the supporting structure (e.g., the body) via fastening, brazing, welding, or another joining method. The manufacturing time and costs associated with the assembly of such a heat exchanger can be increased due to the number of joints formed.

One technical problem of existing heat exchangers is that while the fins provide enhanced heat transfer and added structural benefits, the fins also add resistance to the flow of the second fluid that moves within the channel resulting in fluid shear along the walls of the fins. Additionally, the fins of known system may be deposited close to each other such that the fins are tightly packed within the system. As a result, additional mechanical power, such as fans or blowers 18 must be used to drive the second fluid through the channel and through the tightly packed fins in order to achieve desired cooling.

BRIEF DESCRIPTION

In one or more embodiments, a thermal management system includes a body having an inlet and an outlet configured to direct a first fluid into and out of the body. The body incudes a channel that is fluidly separate from the inlet and the outlet. A second fluid is directed through the channel. A conduit assembly is fluidly coupled with the inlet and the outlet. The conduit assembly includes plural fluidly separate conduits. Each of the plural conduits extend between a corresponding first end and a corresponding second end along a corresponding tortuous path. The plural conduits are intertwined with each other between the first ends and the second ends. The plural conduits are positioned such that the second fluid flowing through the channel passes over the plural conduits and exchanges thermal energy with the first fluid that moves within each of the plural conduits.

In one or more embodiments, a thermal management system includes a body having an inlet and an outlet configured to direct a first fluid into and out of the body. The body also includes a channel that is fluidly separate from the inlet and the outlet. A second fluid is directed through the channel. A conduit assembly is fluidly coupled with the inlet and the outlet. The conduit assembly includes plural fluidly separate conduits. Each of the plural conduits extends between a corresponding first end and a corresponding second end along a corresponding tortuous path. The conduit assembly includes one or more arms coupled with and extending between the plural conduits. The one or more arms maintain a position of each of the plural conduits relative to each other of the plural conduits between the corresponding first and second ends of the plural conduits. The plural conduits are intertwined with each other between the first ends and the second ends. The plural conduits are positioned such that the second fluid flowing through the channel passes over the plural conduits and exchanges thermal energy with the first fluid that moves within each of the plural conduits.

In one or more embodiments, a thermal management system includes a body having an inlet and an outlet configured to direct a first fluid into and out of the body. The body also includes a channel that is fluidly separate from the inlet and the outlet. A second fluid is directed through the channel. A conduit assembly is fluidly coupled with the inlet and the outlet. The conduit assembly includes a first set of plural fluidly separate conduits and a second set of plural fluidly separate conduits. Each of the plural conduits of the first set and the second set extending between a corresponding first end and a corresponding second end along a corresponding tortuous path. The plural conduits of the first set are intertwined with each other between the first ends and the second ends. The plural conduits of the second set are intertwined with each other between the first ends and the second ends. The plural conduits of the first and second sets are positioned such that the second fluid flowing through the channel passes over the plural conduits of the first and second sets and exchanges thermal energy with the first fluid that moves within the first and second sets of the plural conduits.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to thermal management systems (e.g., heat exchangers) and methods that include plural fluidly separate conduits that are intertwined with each other and follow tortuous paths between first ends and second ends. The intertwined conduits direct a first fluid through the system that exchanges thermal energy with a second fluid within a channel of the system. For example, the intertwined conduits may have tortuous paths between first and second ends of the conduits. The tortuous paths of the conduits increase a surface area of the conduits that may interact with the second fluid within the channel to control an amount of thermal energy that may transfer between the first and second fluids. The system may include one or more arms extending between one conduit, and/or one or more arms extending between two or more different conduits to maintain a position of the tortuous path of the conduits between the first and second ends of the conduits. For example, the arms may maintain a helical position of the conduits relative to each other about a center axis.

In one or more embodiments, the conduits may be separated into sets of conduits. For example, a first set of conduits may be intertwined with each other, and a second set of conduits may be intertwined with each other but not intertwined with the conduits of the first set. The different sets of conduits may be separated from each other by a structure disposed within the channel of the system. For example, the structure may separate the first and second sets of conduits from each other, and may improve an amount of stiffness of the system relative to the system not including the structures.

The thermal management system may be used within engines such as those associated with moving or mobile vehicle systems including, but not limited to, automobiles, trucks, buses, mining vehicles, marine vessels, aircraft (manned or unmanned, such as drones), agricultural vehicles, or other off-highway vehicles. As one example, the thermal management system may be used with or in association with an EGR cooler system. Optionally, the thermal management system may be used with stationary power systems such as industrial power systems, turbines, water treatment facilities, any domestic or commercial cooling system, personal appliances or other systems, or the like.

Figure 3:
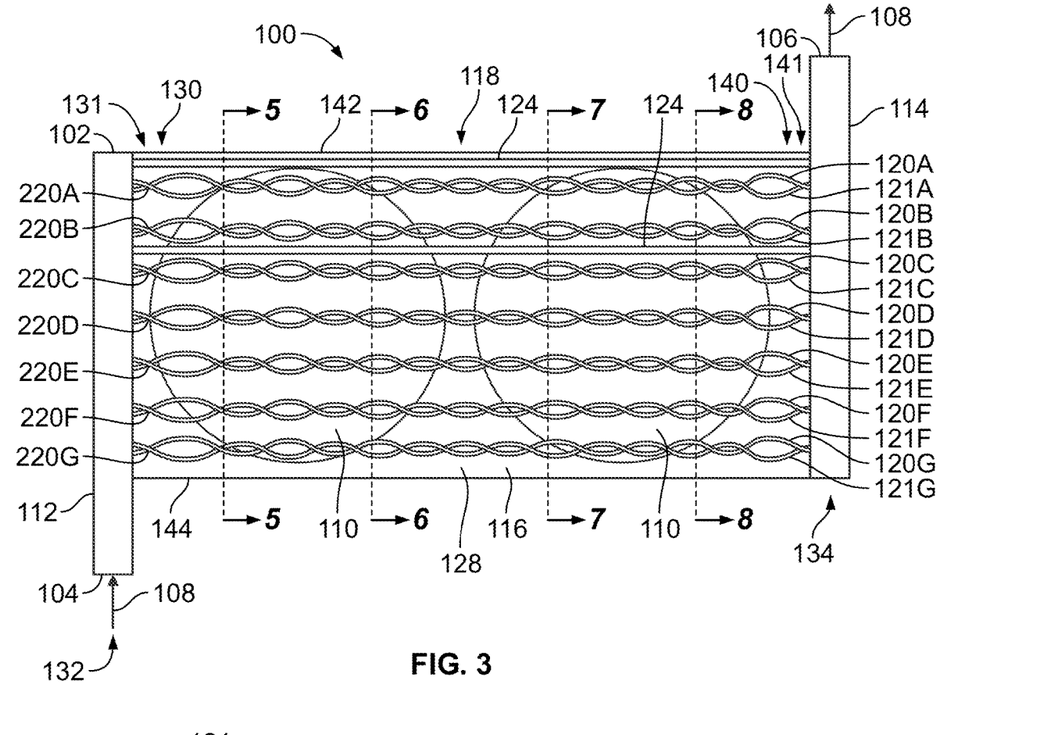
FIG. 3 illustrates a thermal management system in accordance with one embodiment.

FIG. 3 illustrates a front cross-sectional view of a thermal management system 100 in accordance with one embodiment. The system includes a body 102 that has a substantially rectangular shape between first and second ends 132, 134 and top and bottom surfaces 142, 144. The system and the X-Y-Z coordinate system are used herein only for the purpose of explaining aspects of the subject matter and are not intended to limit the scope of the disclosure. In this regard, directional indicators such as "left" and "right," "front" and "back," and "top" and "bottom" are only used to indicate the relative positioning of two sides of the system along the X-direction, the Y-direction, and the Z-direction, respectively.

The body includes an inlet channel 112 disposed at the first end. The inlet channel is fluidly coupled with an inlet 104 through which a first fluid 108 is directed into the system and into the inlet channel. The body also includes an outlet channel 114 that is fluidly coupled with an outlet 106 through which the first fluid is directed out of the system.

The body includes a channel 116 that may be or represent one or more open passages within the body that are fluidly separate from the inlet and inlet channel, and fluidly separate from the outlet and the outlet channel. In the illustrated embodiment, the channel is a single passage that extends substantially between the inlet and outlet channels, and between the top surface and bottom surface of the body. In alternative embodiments, the channel may have an alternative size, may be separated into two or more different channels, or any combination therein.

Figure 4:
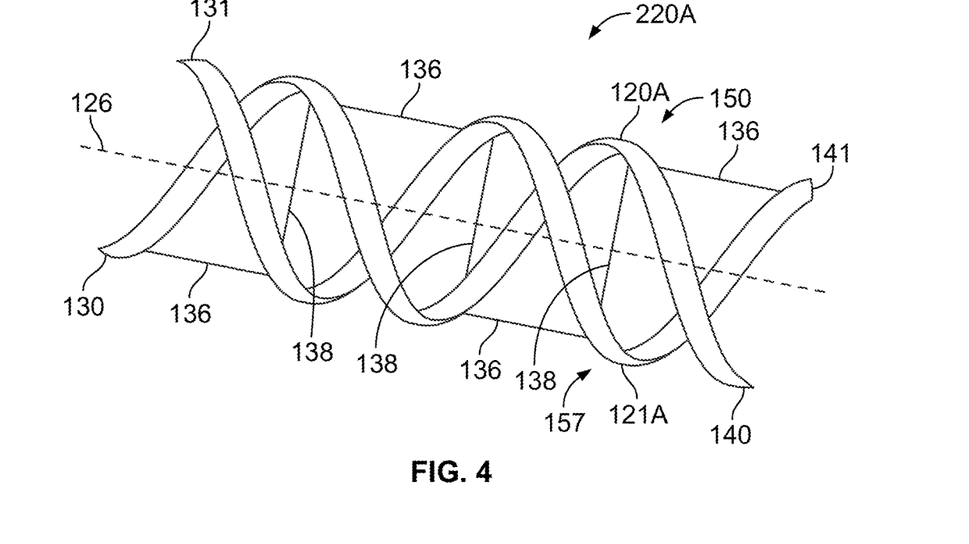
FIG. 4 illustrates a perspective view of conduits of the thermal management system shown in FIG. 3.
Figure 5:
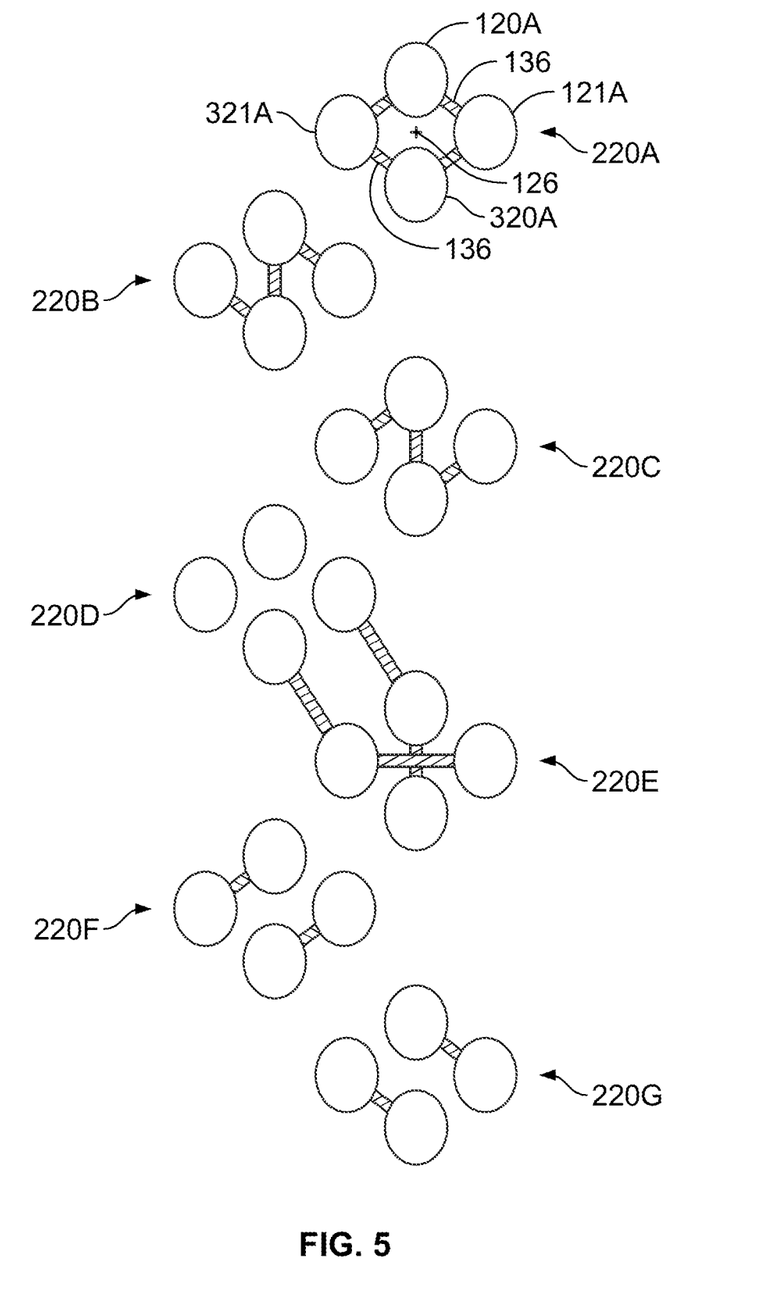
FIG. 5 illustrates cross-sectional view of the thermal management system shown in FIG. 3 at a first location in accordance with one embodiment.
Figure 6:
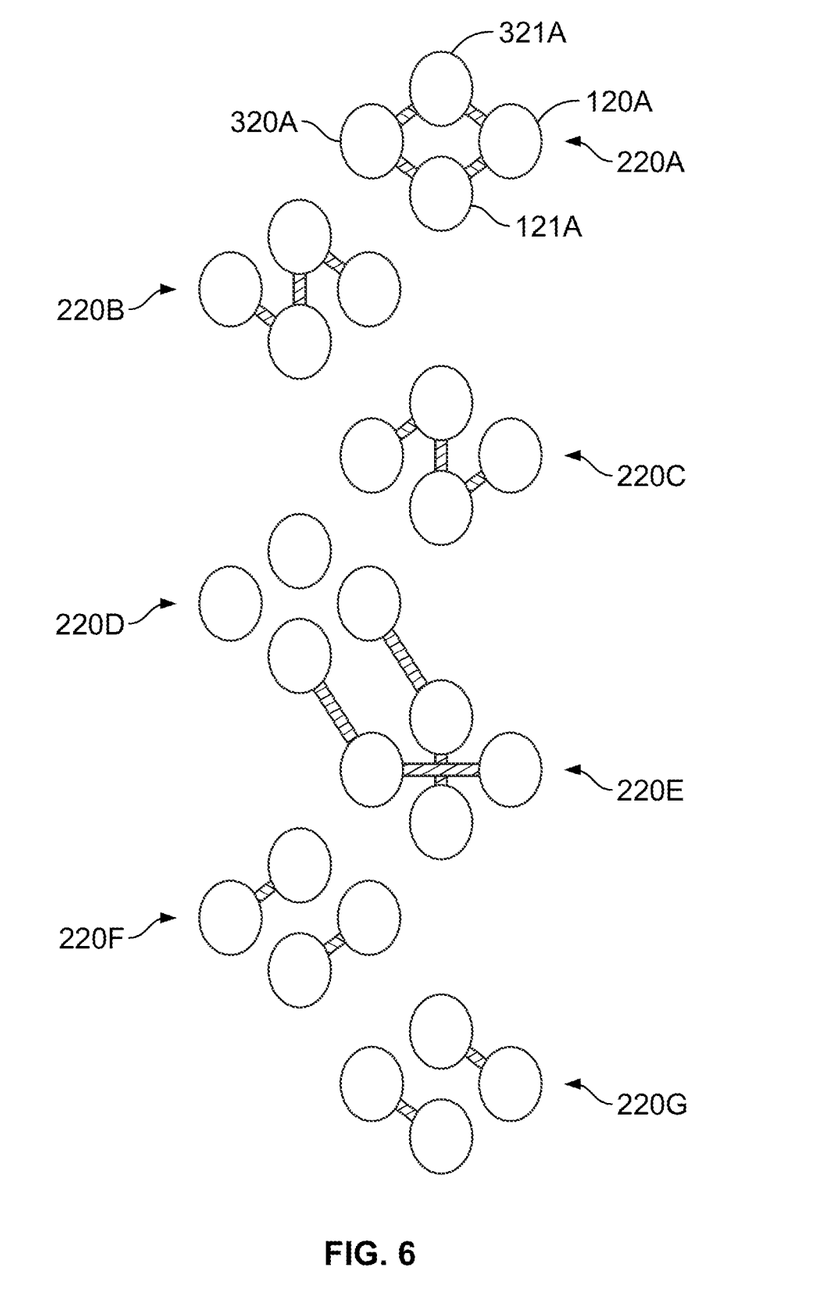
FIG. 6 illustrates cross-sectional view of the thermal management system shown in FIG. 3 at a second location in accordance with one embodiment.
Figure 7:
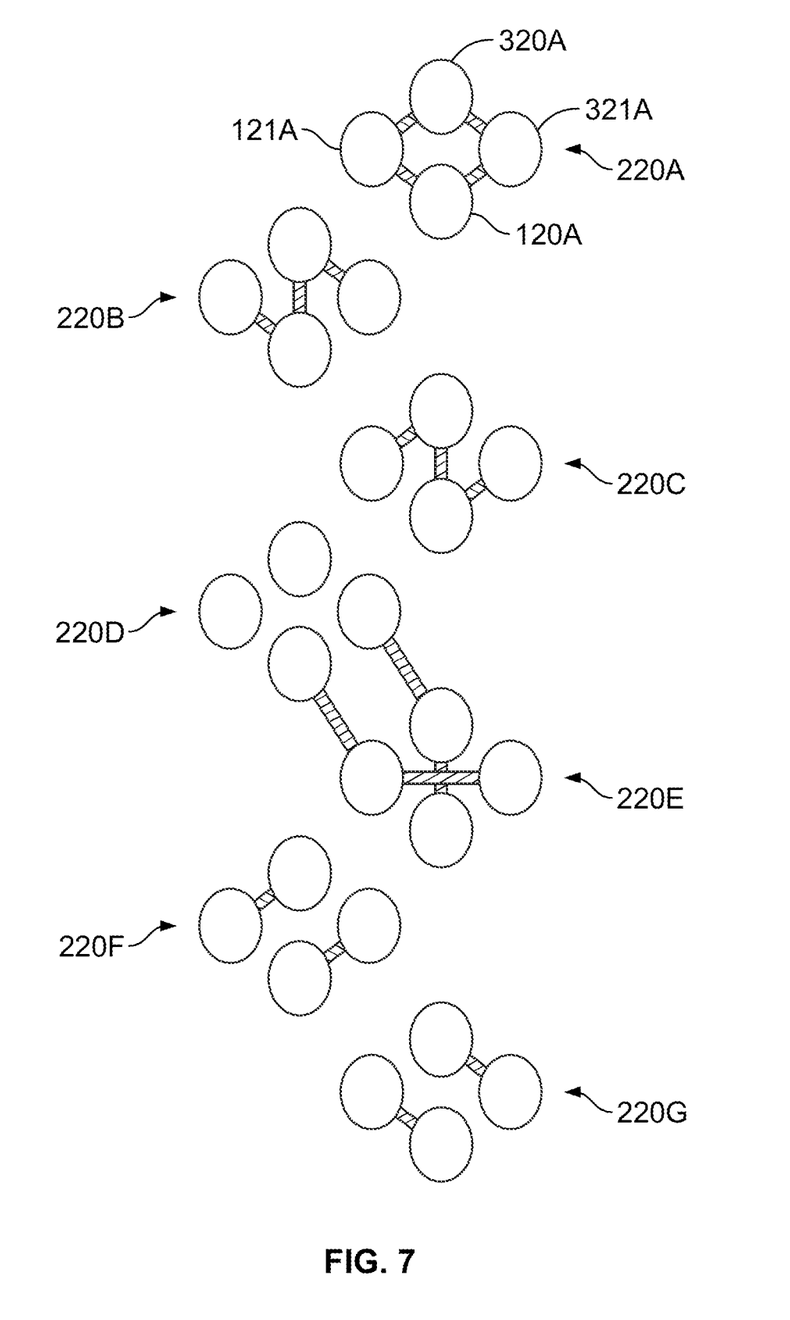
FIG. 7 illustrates cross-sectional view of the thermal management system shown in FIG. 3 at a third location in accordance with one embodiment.
Figure 8:
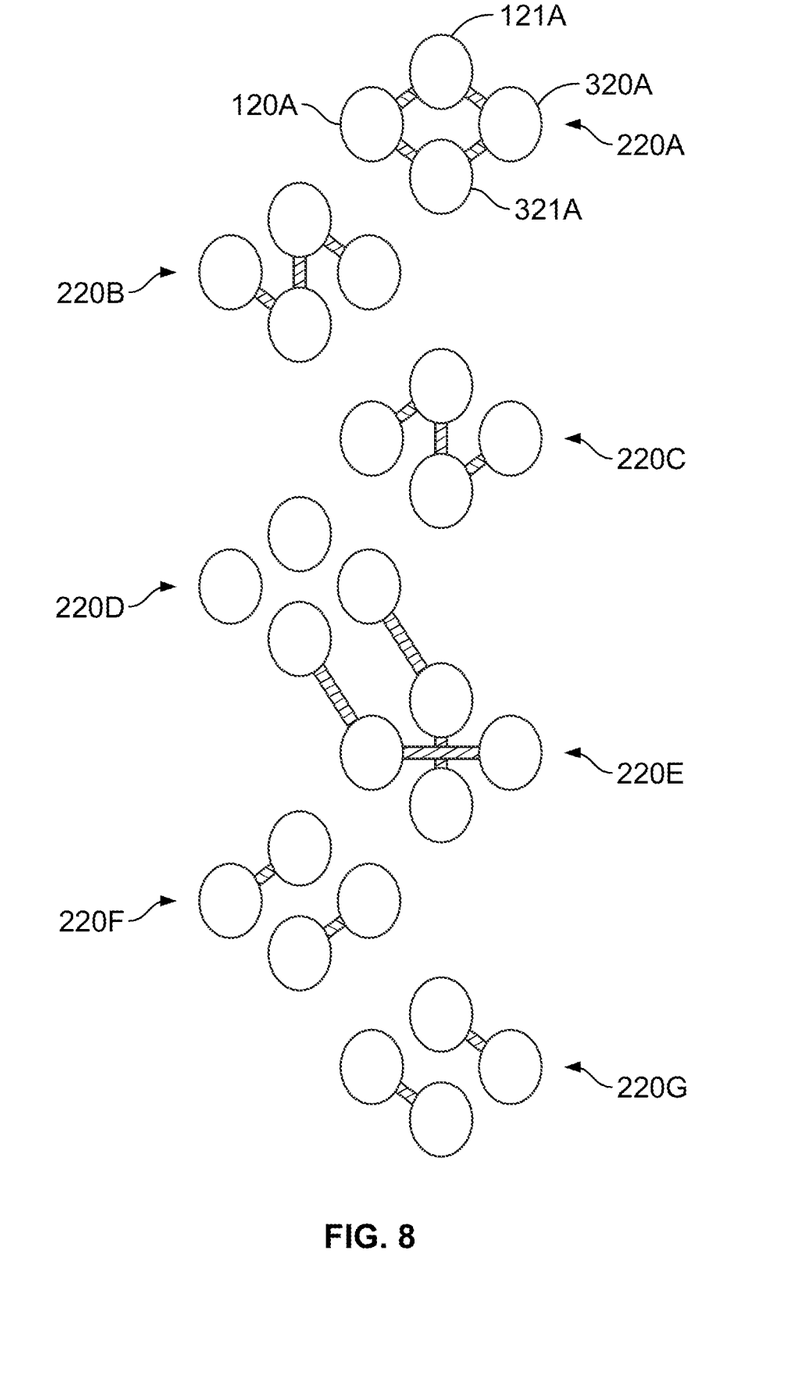
FIG. 8 illustrates cross-sectional view of the thermal management system shown in FIG. 3 at a fourth location in accordance with one embodiment.

The thermal management system also includes a conduit assembly 118. The conduit assembly includes plural fluidly separate conduits 120A-G, 121A-G. Each of the conduits extends from a first end 130, 131 to a second end 140, 141 within the channel. FIG. 4 illustrates one example of a first set 220A of plural conduits of the conduit assembly. The first set includes a first conduit 120A and a second conduit 121A that is fluidly separate from the first conduit. In the illustrated embodiment of FIG. 4, the conduit assembly includes seven sets of conduits 220A-220G, and each set includes two conduits that are fluidly separated from each other. Optionally, the conduit assembly may include any number of sets, and each of the sets may include any number of conduits therein. For example, the first set 220A may include two conduits, and a second set 220B may include three conduits. Optionally, the conduit assembly may include one or more single conduits that are not grouped in sets.

In the illustrated embodiment of FIG. 4, the first conduit extends between the first end 130 and the second end 140, and the second conduit extends between the first end 131 and the second end 141. The first and second conduits extend substantially along an axis 126 between the first and second ends. Additionally, the first and second conduits extend along tortuous paths 150, 151, respectively, between the first and second ends. The tortuous paths of the first and second conduits positions the first and second conduits intertwined with each other between the first and second ends. As one example, the first and second conduits may have a profile similar to that of a strand of DNA. As another example, the first and second conduits may be helically wrapped about the axis between the first and second ends with plural spaces disposed between each helical coil of each of the first and second conduits. For example, the conduits may have tortuous paths that include a curve with tangent lines at a substantially constant angle to the axis. Optionally, the tortuous paths of the conduits may have a curve with tangent lines at a non-constant angle to the axis. Optionally, there may be multiple conduits that form any arrangement.

In the illustrated embodiment of FIG. 4, the first and second conduits have similar tortuous paths relative to each other. For example, the first conduit has a curvature that extends between the first and second ends and about the axis that is substantially similar to a curvature of the second conduit. Optionally, one or more of the conduits may have a different tortuous path relative to the other. For example, the first conduit may include a number of coils that wrap about the axis that is different than a number of coils of the second conduit. Optionally, the first and second conduits may include a common number of coils, but the coils of the first conduit may be separated from each other by a first distance, and the coils of the second conduit may be spaced apart from each other by a different, second distance. Optionally, the second conduit may be a circumferential transformation of the first conduit, rotated by a constant or varying angle along the length of the axis. For example, the angle may change over a length of the axis, may remain substantially constant over another length of the axis, or any combination therein. Optionally, the first conduit may be disposed a first distance away from the axis, and the second conduit may be disposed a shorter or greater distance away from the axis. Optionally, the first conduit may have a patterned tortuous path, and the second conduit may have a random tortuous path between the first and second ends. Optionally, the tortuous path of the first conduit may include a section that extends substantially parallel to the direction of the axis, and another portion that extends in one or more different radial directions away or towards the axis.

The tortuous paths of the conduits between the first and second ends of the conduits provides an amount of thermal energy transfer between the first and second fluids that is similar to or greater than an amount of thermal energy transfer between the first and second fluids in a system including fins (e.g., shown in FIG. 1). One technical problem of existing heat exchangers is that while the fins provide structural support and added heat transfer benefits, the fins also add resistance to the flow of the second fluid that moves between the channels resulting in fluid shear along the walls of the fins. The thermal management system including the conduits having tortuous paths provides an amount of heat transfer between the fluids without compromising the flow of the second fluid with fins. Additionally, the cross-sectional size of the conduits (e.g., show in FIG. 4) may be smaller than a cross-sectional size of the tubes of known systems (e.g., shown in FIG. 2). The smaller size of the conduits of the conduit assembly enables the conduits to have a tortuous path that may be different than tortuous paths of conduits having a larger cross-sectional size. Increasing an amount of travel, or distance of the tortuous paths between the first and second ends increases a surface area of the conduits within the channel. Increasing the surface area of the conduits within the channel increases an amount of thermal energy that may be transferred between the first and second fluids.

The conduits are fluidly coupled with the inlet channel at the first end of the body and are fluidly coupled with the outlet channel at the second end of the body. For example, the first fluid is directed into the body via the inlet, and at least a portion of the first fluid is directed into the one or more conduits via the inlet channel. The first fluid moves between the inlet channel and the outlet channel via the one or more conduits. As the first fluid moves within the conduits and along the tortuous paths of the conduits, the first fluid exchanges thermal energy with the second fluid within the channel. In one embodiment, the first fluid may increase a temperature of the second fluid such that the second fluid cools the first fluid. Alternatively, the first fluid may decrease a temperature of the second fluid such that the second fluid heats the first fluid. The first fluid is directed out of each of the conduits and into the outlet channel. The outlet channel directs the first fluid out of the body via the outlet. In one or more embodiments, the body may include two or more inlets that may direct one or more different fluids into the body. Optionally, the body may include two or more outlets that may direct the fluids out of the body. Optionally, the first fluid may be directed into and out of the conduits by any alternative configuration.

In one or more embodiments, the inlet channel and/or the outlet channel may be coupled with one or more fluid control devices (not shown). For example, the inlet channel may be coupled with a blower or a pump that may promote movement of the first fluid into the inlet channel and towards the conduits. Optionally, the outlet channel may be coupled with a fluid control device (not shown), such as a pump that may promote the movement of the first fluid towards the outlet channel. The inlet channel may be coupled with a flow regulation device, such as a valve, baffle, louver, or the like, to control the flow of the first fluid into the inlet channel and/or through the conduits. Optionally, the outlet channel may be coupled with a fluid regulation device, such as a valve, baffle, louver, or the like, to control the flow of the first fluid out of the outlet channel.

In one or more embodiments, the conduit assembly may include one or more arms 136, 138 that may be coupled with and extend between the plural conduits. In the illustrated embodiment of FIG. 4, the first and second conduits of the first set of conduits includes plural arms 136, 138 that extend between the first and second conduits in different directions. The arms may maintain the tortuous path of the first conduit relative to the tortuous path of the second conduit between the first and second ends. For example, the arms may maintain a helical position of each of the conduits relative to each other about the center axis.

In the illustrated embodiment of FIG. 3, the plural conduits extend in substantially horizontal directions within the body between the inlet channel and the outlet channel. In one or more embodiments, one or more conduits, or one or more sets of conduits may extend in any alternative direction that may not be substantially parallel to the top surface and bottom surface of the body. For example, the first ends 130, 131 of the first set of conduits 220A may be disposed proximate the top surface of the body, and the second ends 140, 141 of the first set of conduits may be disposed proximate the bottom surface of the body. Optionally, the conduit assembly may have any alternative configuration within the body.

A second fluid 128 may be contained and move within the channel. In one or more embodiments, the system may include one or more fluid control devices 110, such as fans, blowers, pumps, valves, baffles, louvers, or the like, that may control a flow rate of the second fluid within the channel. The illustrated embodiment includes two fluid control devices, but alternatively may be void a fluid control device, or may include one or more different devices. In one embodiment, the system may include a fan and a pump that may combine mechanical efforts to control the flow of the second fluid within the channel. In one or more embodiments, the fluid control device may be used to change a flow rate of the second fluid moving within the channel to control an amount of thermal energy that is transferred between the first fluid moving within the conduits and the second fluid within the channel.

In one or more embodiments, the first fluid may be a liquid, a gas, a liquid-gas mixture, a liquid or gas carrying a dispersed solid, or another media. Additionally, the second fluid may be a liquid, a gas, a liquid-gas mixture, or another media that may be the same or different than the first fluid. For example, the first fluid may be water, and the second fluid may be air. Optionally, the first and second fluids may be any alternative phases of different materials.

The system may include one or more structures 124 that may extend between the first and second ends of the body. The structures may provide support to the body within the channel. Additionally, the structures may separate one of the sets of conduits from other sets of conduits. The illustrated embodiment of FIG. 3 includes two structures, but alternatively may include any number of structures within the channel. Optionally, the one or more structures may extend in three or more different directions within the channel, may have any uniform or unique shape or size relative to each other structure, or any combination therein.

In one or more embodiments, one or more portions of the body including the inlet and outlet channels, and the conduit assembly may be manufactured additively as a single, unitary component. For example, the system may be formed as a unitary body. Additively manufacturing the thermal management system allows for the system to be more compact relative to manufacturing the system using non-additively manufacturing methods, such as extruding, stamping, casting, forging, or the like. Additionally, additively manufacturing the system allows the system to having varying three-dimensional shapes, to have multi-domain cooling techniques (e.g., different cooling channels or conduits), or the like, within the same unitary component. Additive manufacturing can involve joining or solidifying material under computer control to create a three-dimensional object, such as by adding liquid molecules or fusing powder grains with each other. Examples of additive manufacturing include three-dimensional (3D) printing, rapid prototyping (RP), direct digital manufacturing (DDM), selective laser melting (SLM), electron beam melting (EBM), direct metal laser melting (DMLM), or the like. Alternatively, the thermal management system, or a portion of the system, can be formed in another manner.

FIGS. 5 through 8 illustrate cross-sectional view of the thermal management system at different locations within the channel. The cross-sectional views illustrated in FIGS. 5 through 8 illustrate the seven sets of conduits. Each of the seven sets of conduits includes four conduits that are fluidly separate from each other. Optionally, the conduit assembly may include any number of sets, each set may include any number of conduits therein, and each conduit may follow any similar or unique tortuous path between the first and second ends relative to each other conduit. One or more arms 136 may be coupled with an extend between two conduits within the same set (e.g., the first set 220A), or optionally or one or more arms may extend between two conduits of different sets (e.g., fourth and fifth sets 220D, 220E).

The conduits may follow substantially similar tortuous paths between the first and second ends. For example, at increasing distances from the first end towards the second end of the body, the paths of the conduits are intertwined with each other. As illustrated in the first set of conduits 220A, conduits 120A, 121A, 320A, 321A rotate to different positions relative to each other about the axis 126 at different positions along a length of the body from the first end to the second end.

Illustrated in FIGS. 5 through 8, each of the conduits includes a substantially uniform cross-sectional shape at each of the different locations between the first and second ends of the conduits. For example, each conduit has a substantially uniform circular cross-sectional shape illustrated in FIGS. 5 through 8. Additionally, the conduits have substantially uniform shapes and sizes relative to each other conduit. In one or more embodiments, a shape and/or size of one or more conduits may change at different locations within the channel. For example, one or more conduits may have a size that gradually increases then gradually decreases between the first and second ends, or alternatively may gradually decrease then gradually increase between the first and second ends. Optionally, the shape of the one or more conduits may change from a substantially circular cross-sectional shape proximate the first end into a substantially oval cross-sectional shape proximate the second end.

Figure 9:
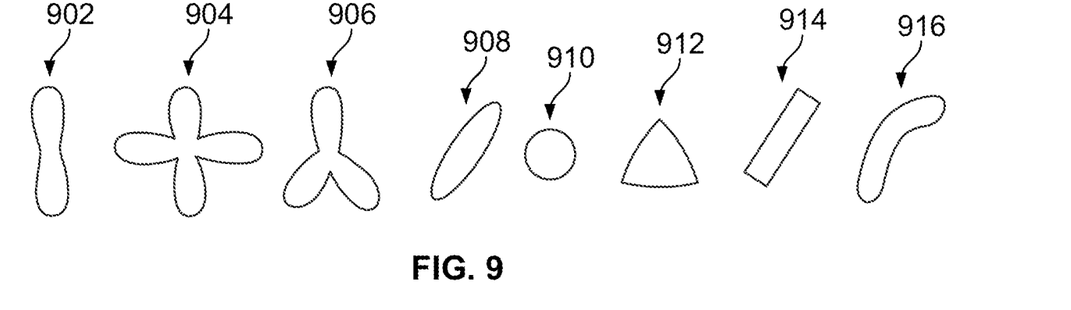
FIG. 9 illustrates plural cross-sectional shapes of conduits of a thermal management system in accordance with one embodiment.

In one or more embodiments, the shape and/or size of the conduits may vary to control a pressure of the first fluid that moves within the conduits between the inlet channel and the outlet channel. Optionally, the shape and/or size of the conduits may vary to control an amount of heat transfer between the first fluid within the conduits and the second fluid within the channel and outside of the conduits. FIG. 9 illustrates different examples of cross-sectional shapes 902-916 of the conduits. One or more conduits may have a shape such as one of the shapes 902-916 to improve an amount of heat transfer between the first and second fluids, such as by increasing a surface area of the conduit. For example, shape 904 has a surface area greater than the shape 902. The first fluid moving within a conduit having the shape 904 may transfer a greater amount of thermal energy with the second fluid outside of the conduit relative to a conduit having the shape 902. As another example, the shape of the conduit may change an amount of resistance of the first fluid that moves within a conduit. For example, a conduit having the shape 906 may have an amount of resistance that is greater than an amount of resistance of the fluid moving within a conduit having the shape 908. As another example, the size of the conduit may change an amount of resistance of the fluid. For example, a conduit having the size of shape 910 may have an amount of resistance of the fluid that is greater than an amount of resistance of the fluid moving within a conduit having the shape 912. Optionally, the shape and/or size of the conduit may be based on an amount of twist of the conduit about the axis (e.g., a 30° or 45° degree angle of twist or pitch relative to the axis), a number of conduits within a set, or the like.

In one or more embodiments, the conduit assembly may be formed via one or more additive manufacturing methods, and the conduits may be coupled with the inlet channel and outlet channel via non-additive manufacturing methods. As one example, one or more conduits may be manufactured using a first material, and a second conduit may be manufactured using a different, second material. Optionally, a portion of a first conduit may be manufactured using a first material, and a second portion of the first conduit may be manufactured using a different, second material. For example, the one or more conduits may be additively manufactured with one or more materials in order to control an amount of thermal energy transferred between the first fluid and the second fluid, to control an amount of thermal energy transfer at a location within the channel, or the like. In one or more embodiments, one or more conduits may be additively manufactured with a first material, and may include a coating disposed along an interior surface of the conduit. Optionally, an interior surface of a conduit may be a first material, and an exterior surface of the conduit may be a second material. Optionally, the interior surface may include a first surface treatment (e.g., hydro-coating, hydro erosion, a smooth finish, or the like) and the exterior surface may include a second surface treatment (e.g., a rough surface treatment). For example, a smooth interior surface of a conduit may reduce an amount of resistance of the fluid moving within the conduit relative to a rough interior surface. Additionally, a rough exterior surface may increase an amount of thermal energy transferred between the first and second fluids relative to a smooth exterior surface.

Figure 10:
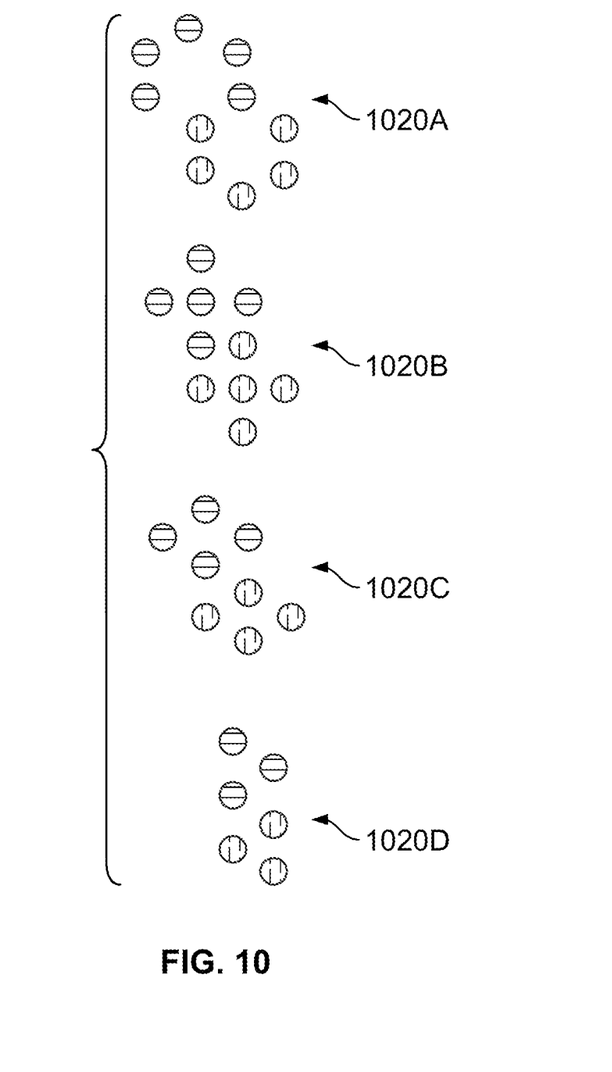
FIG. 10 illustrates a cross-sectional view of plural conduits of a thermal management system in accordance with one embodiment.

In one or more embodiments, the conduits within a set may have different arrangements relative to each other conduit of the set. For example, FIGS. 5 through 8 illustrates each of the sets 220A-G having a common number of four conduits within each set, and each set of conduits substantially uniformly spaces the conduits apart from each other in a quadrilateral shape. Optionally, one or more sets of conduits may have a different number of conduits, and the conduits within one of the sets may be spaced apart from each other in a different shape. For example, FIG. 10 illustrates different examples of sets of conduits 1020A-1020D. The first set 1020A includes ten conduits in a first arrangement, and the second set 1020B includes ten conduits in a different arrangement. The third set 1020C includes eight conduits in an arrangement that is different than the arrangement of the sets 220A-G illustrated in FIG. 5. The fourth set 1020D includes six conduits in another arrangement. Optionally, the conduit assembly may include any number of conduits, the conduits may be separated or grouped into any number of sets, the sets may include any number of conduits, and the conduits may be arranged in any arrangement relative to each other conduit, or the like.

Figure 11:
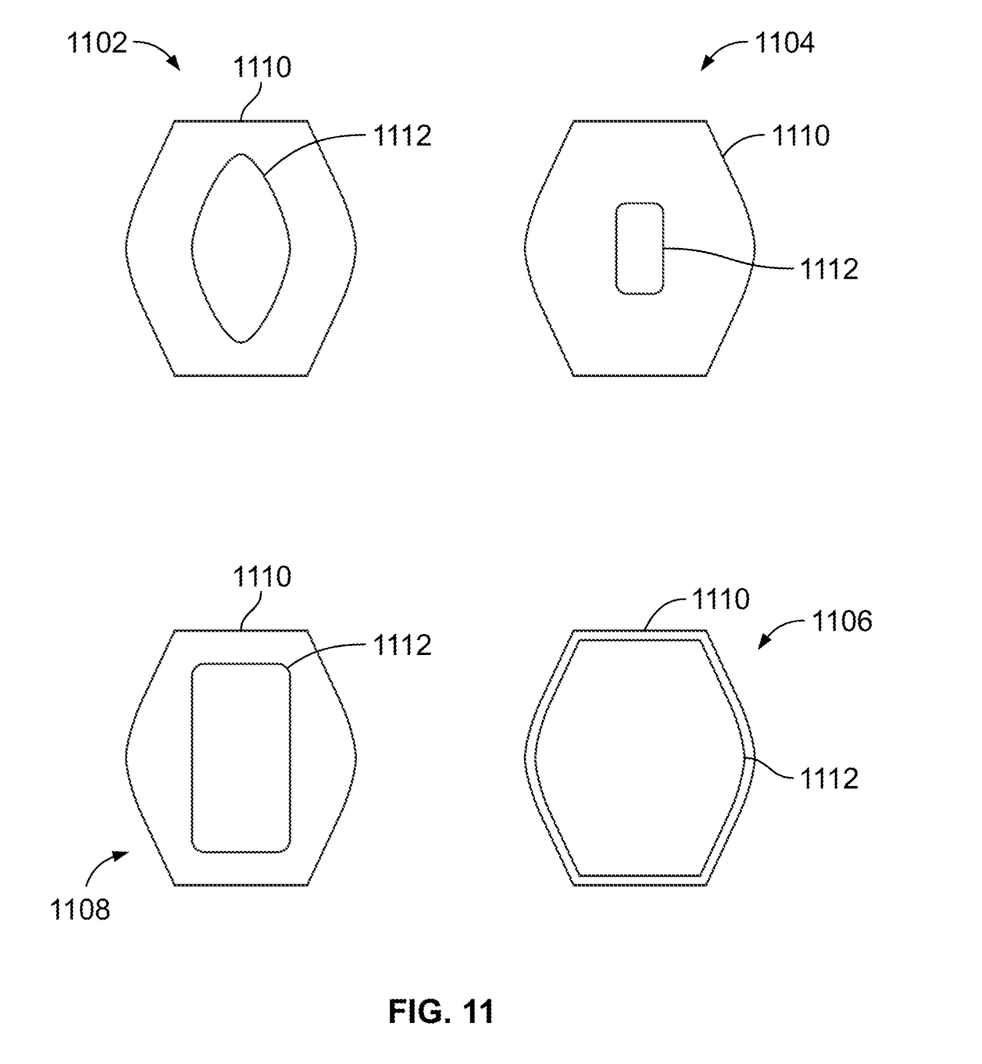
FIG. 11 illustrates plural examples of cross-sectional views of conduits of a thermal management system in accordance with one embodiment.

FIG. 11 illustrates examples of the conduits having different internal and external shapes and sizes. For example, a first conduit 1102 has an external surface 1110 and an internal surface 1112. Second, third, and fourth conduits 1104, 1106, 1108, respectively, have external surfaces that form outer profiles that are substantially similar to an outer profile of the first conduit. Additionally, the internal surfaces of the first, second, third, and fourth conduits 1102-1108 form internal conduits having different shapes relative to each other, and relative to the outer profiles of the conduits. For example, the external surface of the first conduit forms an outer profile that is substantially similar to an outer profile of the second, third, and fourth conduits. Optionally, one or more of the conduits may have a different outer profile (e.g., as illustrated in FIG. 9). The inner surface of the first conduit forms the internal conduit having a shape that is different than the outer profile of the first conduit. Additionally, the internal conduit of the first conduit has a shape that is different than the internal conduit of the second conduit.

In one or more embodiments, a thermal management system includes a body having an inlet and an outlet configured to direct a first fluid into and out of the body. The body incudes a channel that is fluidly separate from the inlet and the outlet. A second fluid is directed through the channel. A conduit assembly is fluidly coupled with the inlet and the outlet. The conduit assembly includes plural fluidly separate conduits. Each of the plural conduits extend between a corresponding first end and a corresponding second end along a corresponding tortuous path. The plural conduits are intertwined with each other between the first ends and the second ends. The plural conduits are positioned such that the second fluid flowing through the channel passes over the plural conduits and exchanges thermal energy with the first fluid that moves within each of the plural conduits.

Optionally, the conduit assembly may include one or more arms coupled with and extending between the plural conduits. The one or more arms may maintain a position of each of the plural conduits relative to each other of the plural conduits between the corresponding first and second ends of the plural conduits.

Optionally, the one or more arms may maintain the corresponding tortuous path of each of the plural conduits relative to the tortuous path of each other conduit.

Optionally, the one or more arms may maintain a helical position of each of the plural conduits relative to each other about an axis.

Optionally, each of the plural conduits includes a first end, a second end, and a tortuous path.

Optionally, the plural conduits may be helically wrapped about an axis between the first and second ends of the plural conduits.

Optionally, a first conduit of the plural conduits may include an internal surface forming a first internal conduit. A second conduit of the plural conduits may include an internal surface forming a second internal conduit.

Optionally, the first internal conduit has a shape that is different than a shape of the second internal conduit.

Optionally, the first and second conduits may be intertwined with each other between the first and second ends of the first and second conduits.

Optionally, a first conduit of the plural conduits includes an external surface forming an outer profile, and an opposite internal surface forming an internal conduit. The outer profile may have a shape that is different than a shape of the internal conduit.

Optionally, the system may include one or more fluid control devices coupled with the body. The one or more fluid control devices may control a flow rate of the second fluid within the channel.

Optionally, the one or more fluid control devices may include one or more blowers, fans, pumps, valves, baffles, or louvers.

Optionally, the one or more fluid control devices may change the flow rate of the second fluid to control an amount of thermal energy transferred between the first fluid and the second fluid.

Optionally, the plural fluidly separate conduits is a first set of plural fluidly separate conduits. The conduit assembly may include a second set of plural fluidly separate conduits.

Optionally, a structure may be disposed between the first set of plural conduits and the second set of plural conduits.

Optionally, each of the plural conduits may be fluidly coupled with an inlet channel. At least a portion of the first fluid may be directed into each of the plural conduits via the inlet channel.

Optionally, each of the plural conduits may be fluidly coupled with an outlet channel. The first fluid may be directed out of each of the plural conduits via the outlet channel.

In one or more embodiments, a thermal management system includes a body having an inlet and an outlet configured to direct a first fluid into and out of the body. The body also includes a channel that is fluidly separate from the inlet and the outlet. A second fluid is directed through the channel. A conduit assembly is fluidly coupled with the inlet and the outlet. The conduit assembly includes plural fluidly separate conduits. Each of the plural conduits extends between a corresponding first end and a corresponding second end along a corresponding tortuous path. The conduit assembly includes one or more arms coupled with and extending between the plural conduits. The one or more arms maintain a position of each of the plural conduits relative to each other of the plural conduits between the corresponding first and second ends of the plural conduits. The plural conduits are intertwined with each other between the first ends and the second ends. The plural conduits are positioned such that the second fluid flowing through the channel passes over the plural conduits and exchanges thermal energy with the first fluid that moves within each of the plural conduits.

Optionally, each of the plural conduits includes a first end, a second end, and a tortuous path.

In one or more embodiments, a thermal management system includes a body having an inlet and an outlet configured to direct a first fluid into and out of the body. The body also includes a channel that is fluidly separate from the inlet and the outlet. A second fluid is directed through the channel. A conduit assembly is fluidly coupled with the inlet and the outlet. The conduit assembly includes a first set of plural fluidly separate conduits and a second set of plural fluidly separate conduits. Each of the plural conduits of the first set and the second set extending between a corresponding first end and a corresponding second end along a corresponding tortuous path. The plural conduits of the first set are intertwined with each other between the first ends and the second ends. The plural conduits of the second set are intertwined with each other between the first ends and the second ends. The plural conduits of the first and second sets are positioned such that the second fluid flowing through the channel passes over the plural conduits of the first and second sets and exchanges thermal energy with the first fluid that moves within the first and second sets of the plural conduits.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A thermal management system comprising:
    a body comprising an inlet and an outlet configured to direct a first fluid into and out of the body, the body also comprising a channel that is fluidly separate from the inlet and the outlet, the channel configured to direct flow of a second fluid; and
    a conduit assembly fluidly coupled with the inlet and the outlet, the conduit assembly comprising plural fluidly separate conduits, each of the plural conduits extending between a corresponding first end and a corresponding second end along a corresponding tortuous path, the plural conduits arranged in sets, each of the sets having a common axis and including two or more of the plural conduits extending along tortuous paths along their corresponding common axis,
    wherein the plural conduits of each of the sets of the plural conduits are intertwined with each other between the first ends and the second ends such that they are helically wrapped about the common axis,
    plural arms coupled with and extending between the plural conduits, one or more of the arms coupled with and extending between each of the two or more conduits of a first set of the sets of the plural conduits, one or more of the arms coupled with and extending between each of the two or more conduits of a second set of the sets of plural conduits, and one or more of the arms coupled and extending between one of the two or more conduits of the first set and one of the two or more conduits of the second set,
    wherein the plural conduits are positioned such that the second fluid flowing through the channel passes by the plural conduits and exchanges thermal energy with the first fluid that moves within each of the plural conduits.

2. The thermal management system of claim 1, wherein one or more of the arms are configured to maintain a position of each of the plural conduits relative to each other of the plural conduits between the corresponding first and second ends of the plural conduits.

3. The thermal management system of claim 2, wherein one or more of the arms are configured to maintain the corresponding tortuous path of each of the plural conduits relative to the tortuous path of each other conduit.

4. The thermal management system of claim 2, wherein one or more of the arms are configured to maintain a helical position of each of the plural conduits relative to each other about each common axis.

5. The thermal management system of claim 1, wherein a first conduit of the plural conduits is configured to include an internal surface forming a first internal conduit, and a second conduit of the plural conduits is configured to include an internal surface forming a second internal conduit.

6. The thermal management system of claim 5, wherein the first internal conduit has a shape that is different than a shape of the second internal conduit.

7. The thermal management system of claim 5, wherein the first and second conduits are configured to be intertwined with each other between the first and second ends of the first and second conduits.

8. The thermal management system of claim 1, wherein a first conduit of the plural conduits is configured to include an external surface forming an outer profile and an opposite internal surface forming an internal conduit, wherein the outer profile has a shape that is different than a shape of the internal conduit.

9. The thermal management system of claim 1, further comprising one or more fluid control devices coupled with the body, wherein the one or more fluid control devices are configured to control a flow rate of the second fluid within the channel.

10. The thermal management system of claim 9, wherein the one or more fluid control devices includes one or more blowers, fans, pumps, valves, baffles, or louvers.

11. The thermal management system of claim 9, wherein the one or more fluid control devices are configured to change the flow rate of the second fluid to control an amount of thermal energy transferred between the first fluid and the second fluid.

12. The thermal management system of claim 1, wherein each of the plural conduits are configured to be fluidly coupled with an inlet channel, wherein at least a portion of the first fluid is configured to be directed into each of the plural conduits via the inlet channel.

13. The thermal management system of claim 1, wherein each of the plural conduits are configured to be fluidly coupled with an outlet channel, wherein the first fluid is configured to be directed out of each of the plural conduits via the outlet channel.

* * * * *